US006779766B1

(12) United States Patent
Hade et al.

(10) Patent No.: US 6,779,766 B1
(45) Date of Patent: Aug. 24, 2004

(54) ADD-ON WEDGE LOCK CONNECTOR FOR AUTOMOBILE

(76) Inventors: Alain Hade, 351, des Chênes, Les Cères, Quebec J7T 3C1 (CA); René Hade, 1375, Terrasse Bourgeois, Longueuil, Quebec J4M 2E3 (CA)

( * ) Notice: Subject to any disclaimer, the term of this patent is extended or adjusted under 35 U.S.C. 154(b) by 46 days.

(21) Appl. No.: 10/418,597

(22) Filed: Apr. 21, 2003

(51) Int. Cl.[7] .............................................. A47B 96/00
(52) U.S. Cl. ......................... 248/224.51; 248/224.61; 248/224.41; 248/229.21; 248/229.11; 248/228.2; 248/231.41; 248/231.31; 224/539; 108/69
(58) Field of Search ....................... 248/224.51, 224.61, 248/224.41, 219.4, 316.2, 229.21, 229.11, 228.2, 231.41, 231.31; 224/539, 277, 540, 572, 555, 558, 578, 570; 206/233; 108/69, 90, 97, 98, 65

(56) References Cited

U.S. PATENT DOCUMENTS

| 2,940,715 | A | * | 6/1960 | Schultz et al. ......... 248/231.41 |
| 2,969,900 | A | | 1/1961 | Heuler |
| 3,048,457 | A | | 8/1962 | Haase |
| 3,089,597 | A | * | 5/1963 | Kaplan ....................... 224/400 |
| 3,163,287 | A | * | 12/1964 | Barnett ....................... 224/540 |
| 3,223,281 | A | * | 12/1965 | Larkin ......................... 221/46 |
| 3,285,398 | A | * | 11/1966 | Karkin ....................... 224/540 |
| 3,288,301 | A | * | 11/1966 | Kent ....................... 211/41.17 |
| 3,502,222 | A | * | 3/1970 | Crafoord ....................... 211/40 |
| 3,561,589 | A | | 2/1971 | Larkin et al. |
| 3,630,343 | A | * | 12/1971 | Wohl .......................... 224/277 |
| 3,658,219 | A | | 4/1972 | Ordt |
| 3,939,986 | A | | 2/1976 | Pierro |
| 4,061,971 | A | * | 12/1977 | Barrons ..................... 455/90.3 |
| 4,371,138 | A | | 2/1983 | Roberts |
| 4,524,701 | A | | 6/1985 | Chappell |
| 5,169,105 | A | * | 12/1992 | Yasukawa ................. 248/205.2 |
| 5,664,714 | A | * | 9/1997 | Navarro et al. ............. 224/275 |
| 5,730,065 | A | * | 3/1998 | Smith .......................... 108/44 |
| 5,813,579 | A | | 9/1998 | Hendrickson |
| 5,822,918 | A | | 10/1998 | Helfman |
| 6,073,901 | A | | 6/2000 | Richter |
| 6,170,725 | B1 | * | 1/2001 | Ganues ....................... 224/539 |

FOREIGN PATENT DOCUMENTS

| EP | 0280638 | A2 | * | 8/1988 | |
| GB | 2257463 | A | * | 1/1993 | .......... B60R/11/02 |

\* cited by examiner

*Primary Examiner*—Kimberly Wood

(57) ABSTRACT

A securing device for releasable attachment of a tissues box to a car console. The device includes a trapezoidal template having a pair of opposite lateral side edge portions each with a lengthwise groove. Hook and loop fasteners releasably interconnect the template to the tissues box underface. A pair of arcuate wedge members are provided, to engage the opposite side upper wall corner portions of the car console. The first arcuate wedge member further includes a lateral side edge portion thereof forming a slider lip sized for complementary sliding engagement with the lengthwise groove of the first side edge portion of the template. The second arcuate wedge member further includes a lateral side edge portion thereof forming a slider lip sized for complementary sliding engagement with the lengthwise groove of the second side edge portion of the template. This way, by slidingly inserting the tissues box carrying template along the facing slider lips of the two arcuate wedge members, progressive frictional wedge interlock occurs between the tissue box and the console.

4 Claims, 9 Drawing Sheets

ADD-ON WEDGE LOCK CONNECTOR FOR AUTOMOBILE

FIELD OF THE INVENTION

This invention relates to holders of small items in automobile cockpits.

BACKGROUND OF THE INVENTION

In automobiles, there is often a need for access to small items such as facial tissues box, coin holders, cellular phone holsters, CD cassette casing, sun glasses, and the like, and there may not be a suitable integral compartment inside the car cockpit to accommodate any one of these items. Leaving these items simply on the automobile floor can be hazardous during driving, as they may move or fly around when the car is in motion which will distract the driver from his driving focus. Existing add-on holders for inside cockpits of cars are usually of low versatility, of cumbersome installation since normally requiring tools for installation, and not easily removable for transfer and fitting to a new vehicle.

OBJECTS OF THE INVENTION

It is therefore an object of the present invention to provide a load securing assembly for add-on fitting on a car console, that does not require any screws, bolts or nuts, so that no tool is required for its installation.

Another object is that the assembly be easily removable for transfer to a new vehicle.

Another object is that there is no maintenance required.

SUMMARY OF THE INVENTION

The invention generally relates to a securing device for releasable attachment of a tissues box to a car console. The device includes a trapezoidal template having a pair of opposite lateral side edge portions each with a lengthwise groove. Hook and loop fasteners releasably interconnect the template to the tissues box underface. A pair of arcuate wedge members are provided, to engage the opposite side upper wall corner portions of the car console. The first arcuate wedge member further includes a lateral side edge portion thereof forming a slider lip sized for complementary sliding engagement with the lengthwise groove of the first side edge portion of the template. The second arcuate wedge member further includes a lateral side edge portion thereof forming a slider lip sized for complementary sliding engagement with the lengthwise groove of the second side edge portion of the template. This way, by slidingly inserting the tissues box carrying template along the facing slider lips of the two arcuate wedge members, progressive frictional wedge interlock occurs between the tissue box and the console.

The invention also relates to a securing device for releasable attachment of a tissues box to a car console, the tissues box including an underface, the car console including a top wall with opposite first and second corner wall portions, said securing device comprising: a) a template having a top face, for registering with the tissues box underface, and a bottom face, for engagement with the car console top wall; b) anchor means for releasable anchoring of said template top face to the tissues box underface; c) first wedge means, for frictional interlock of said template with the console first corner wall portion; d) second wedge means, for frictional interlock of said template with the console second corner wall portion.

Preferably, said anchor means consists of hook and loop fastener means. At least one of said template, of said first wedge means, and of said second wedge means, could include a handle means for facilitating handling thereof.

The invention also relates to a securing device for releasable attachment of a tissues box to a car console, the tissues box including an underface, the car console including a top wall with opposite first and second corner wall portions, said securing device comprising: a) a trapezoidal template having a front edge, a rear edge opposite to and smaller than said front edge, and opposite first side edge portion and second side edge portion diverging in a rear to fore direction, each of said first side edge portion and of said second side edge portion respectively forming a first female slider element and a second female slider element; said template further defining a top face, for registering with the tissues box underface, and a bottom face, for engagement with the car console top wall; b) anchor means for releasable anchoring of said template top face to the tissues box underface; c) an arcuate first wedge member having a front end, a rear end opposite to and larger than said front end, and opposite first free side edge portion and second side edge portion, said second side edge portion forming a male slider element complementary to said template first female slider element, said first free side edge portion for frictional engagement with the car console first corner wall portion; d) an arcuate second wedge member having a front end, a rear end opposite to and larger than said front end, and opposite first free side edge portion and second side edge portion, the latter said second side edge portion forming a male slider element complementary to said template second female slider element, the latter first free side edge portion for frictional engagement with the car console second corner wall portion; wherein upon fore to aft sliding motion of said template between said first wedge member and said second wedge member, said first wedge member and said second wedge member form wedge means for progressively tightening frictional interlock of said template with the console corner wall portions.

Preferably, there is further provided a self-adhesive resilient strip, mounted to at least a fraction of said first free side edge portion of at least one of said first wedge member and of said second wedge member, said resilient strip for snug engagement with a respective one of the car console first side wall and second corner wall portions.

DETAILED DESCRIPTION OF THE PREFERRED EMBODIMENT

Figure 1:
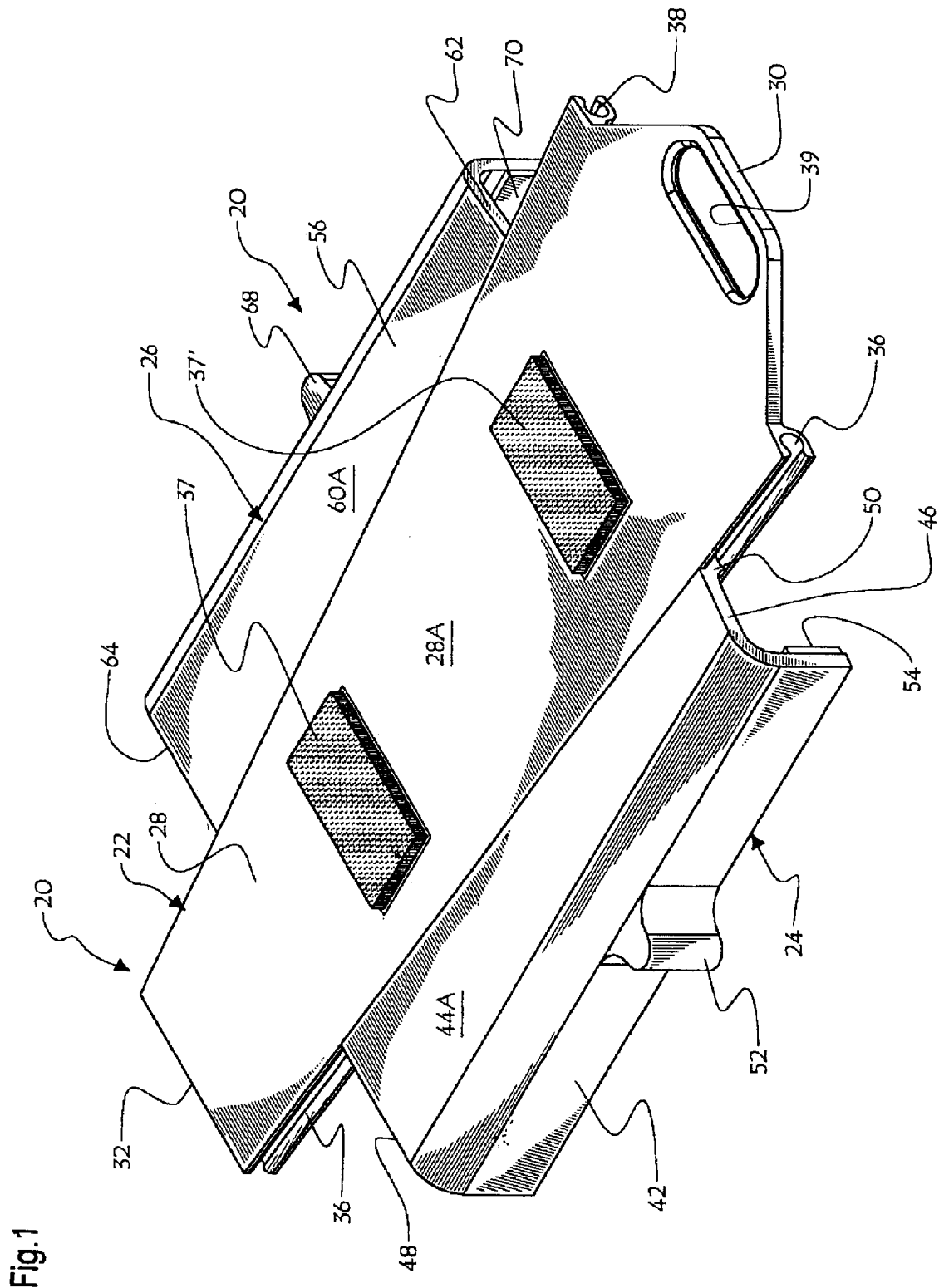
FIG. 1 is a top perspective view of a preferred embodiment of the load securing assembly of the invention.
Figure 2:
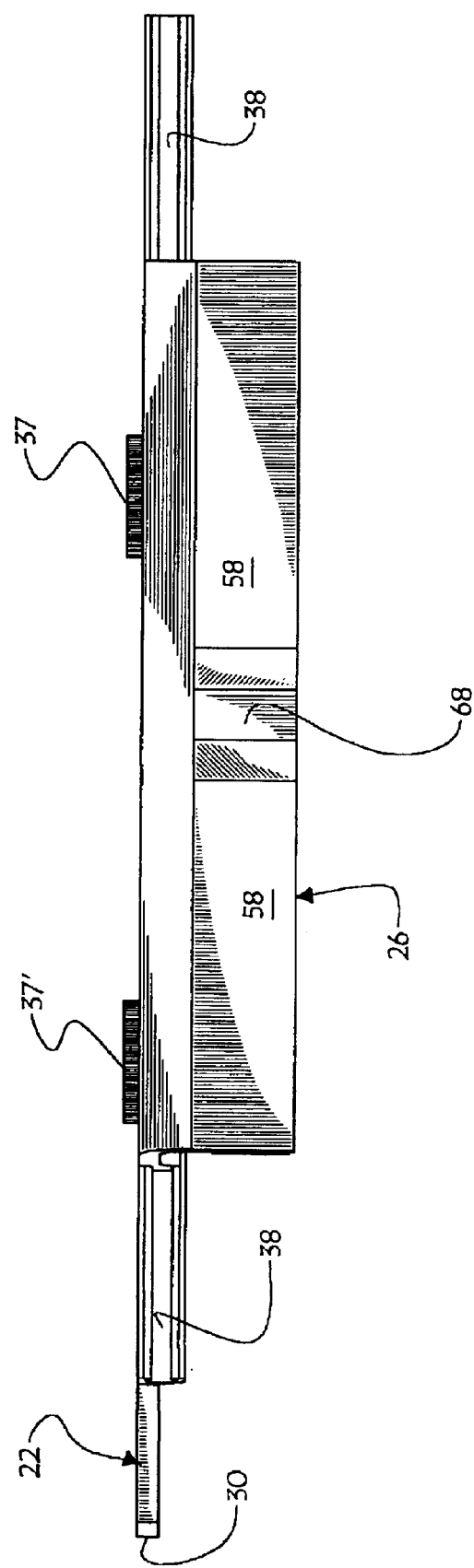
FIG. 2 is an enlarged lateral side edge view of this load securing assembly.
Figure 5:
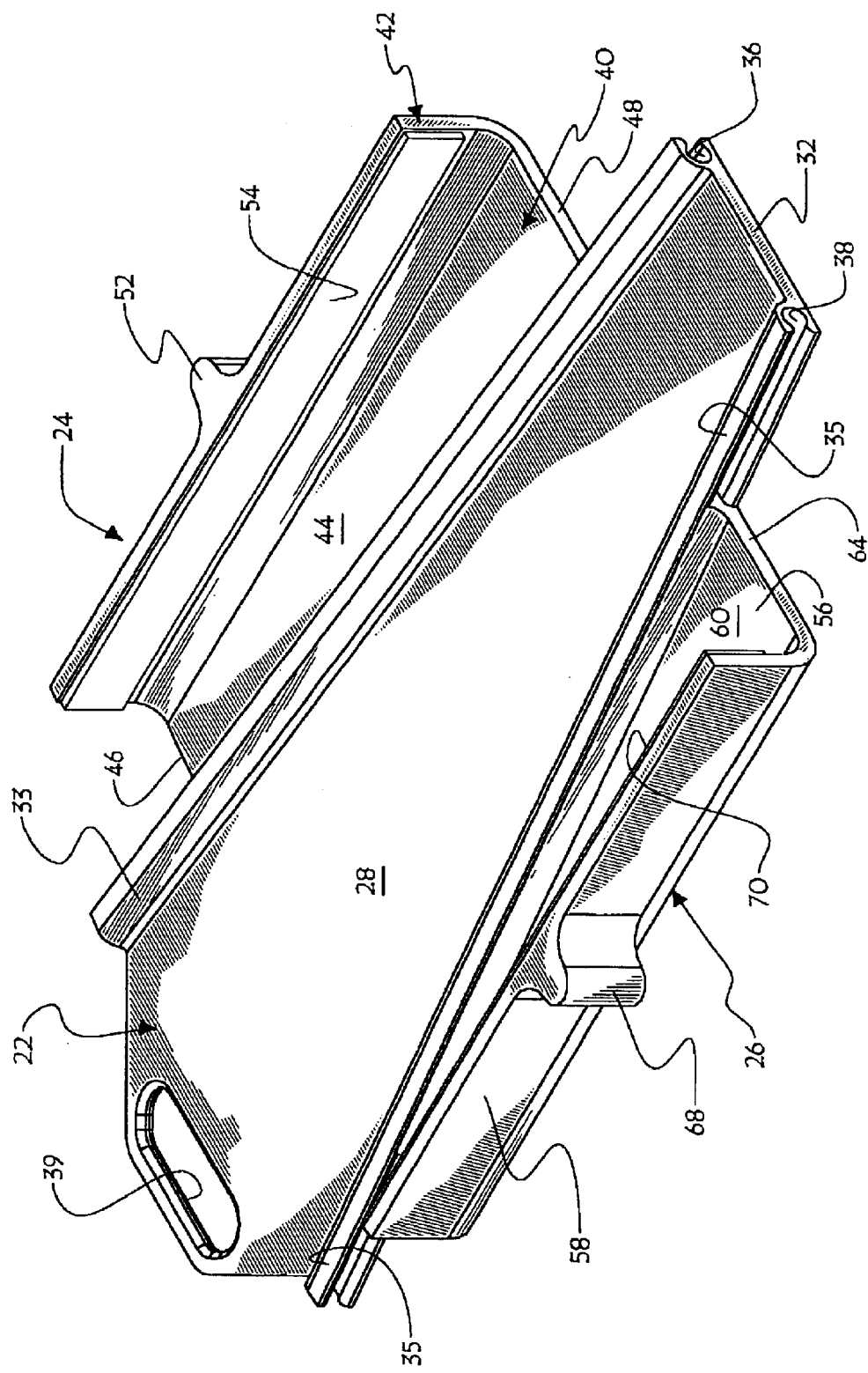
FIG. 5 is a bottom perspective view of this load securing assembly.
Figure 6:
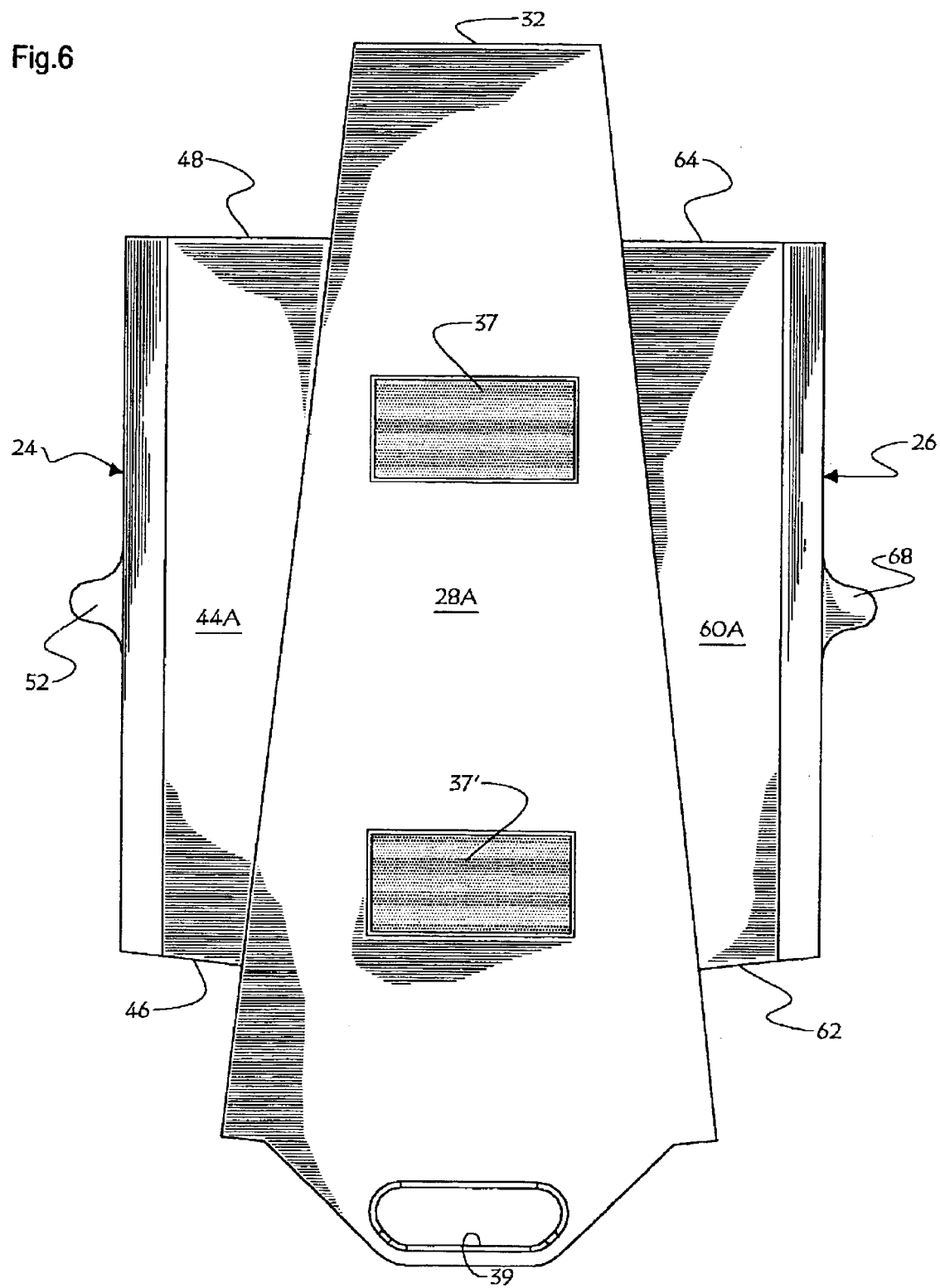
FIG. 6 is an enlarged top plan view of this load securing assembly.
Figure 7:
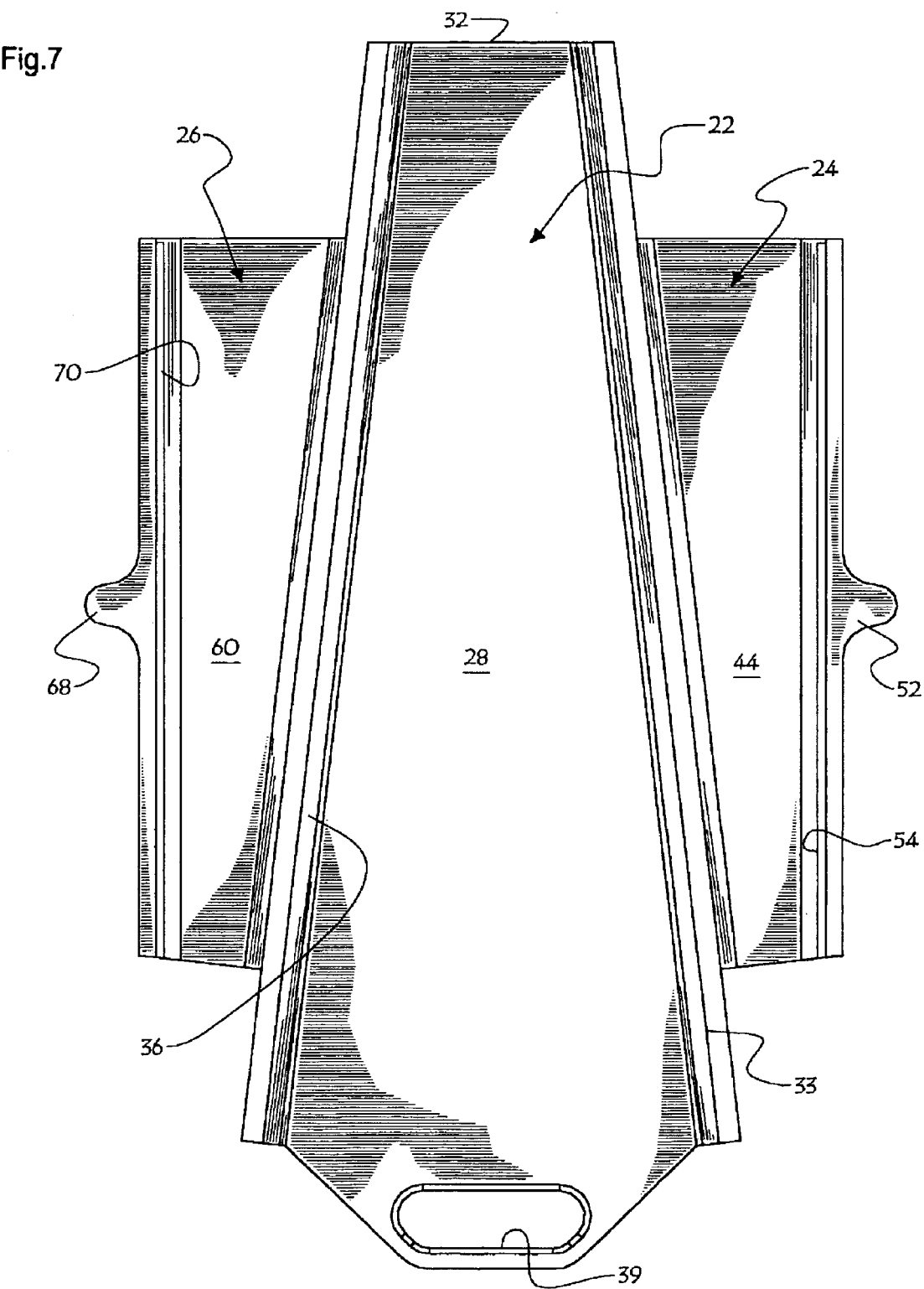
FIG. 7 is a bottom plan view of this load securing assembly.

The load securing assembly 20 in FIGS. 1 and 5 includes three main components:

a) A trapezoidal flat intermediate panel 22;
b) A first lateral side trapezoidal arcuate panel 24; and
c) A second lateral side trapezoidal arcuate panel 26 opposite first side panel 24.

Intermediate panel 22 defines a main flat thin panel body 28 having a generally convex front edge portion 30, a straight rear edge 32 shorter than front edge 30, and two opposite enlarged lateral side edge portions 33 and 35 converging toward one another in a fore to aft direction. Each side edge portion 33 and 35 defines an out-turned lengthwise groove 36, 38, respectively, opening in opposite directions relative to one another. The outer face 28A of panel body 28 should further include means—such as at least one or two hook or loop strips 37, 37',—for releasable interlocking with a corresponding hook or loop strip (not shown) integral to a load article wall, for example the underface of a facial tissue box B (FIGS. 8–9) An ovoïdal aperture 39 could be made into front edge portion 30, to provide a handle for facilitating manual handling of intermediate panel 22.

Figure 10:
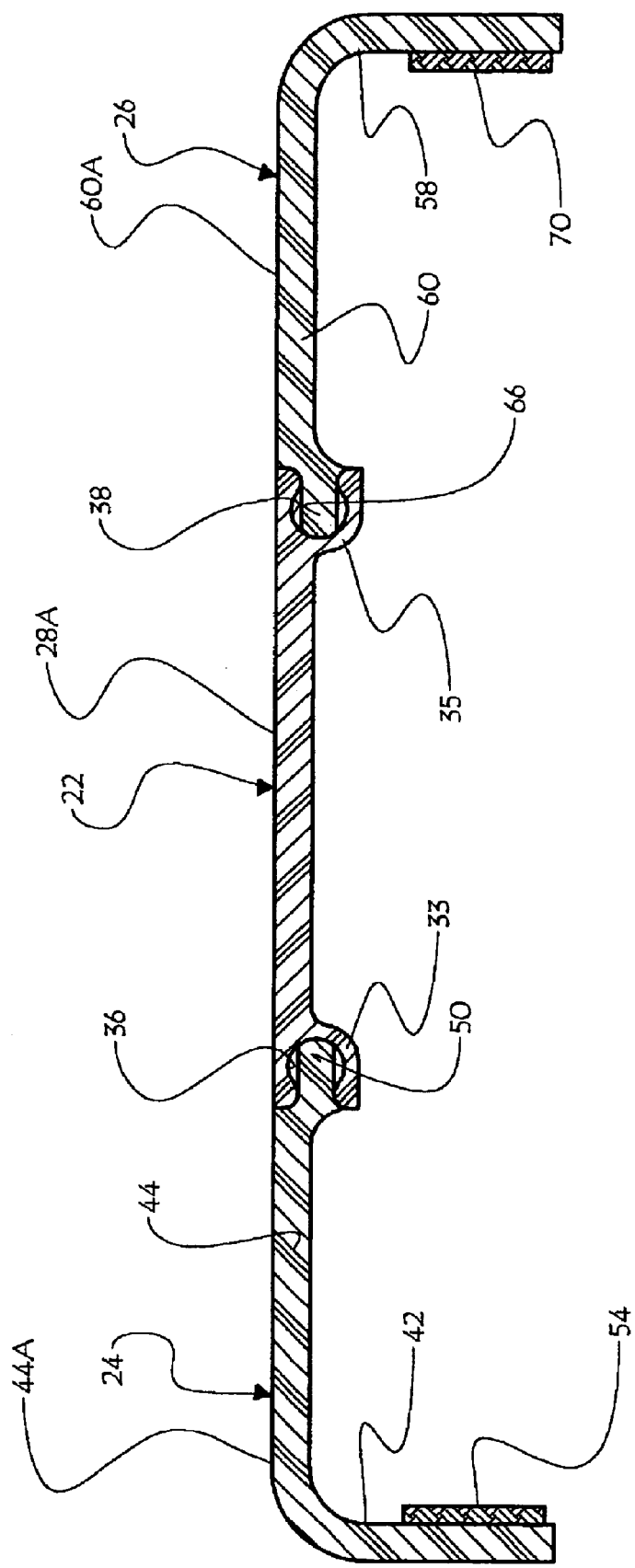
FIG. 10 is a cross-sectional view of this load securing assembly, in assembled condition, at a larger scale than FIG. 3 or 4.

As shown in FIGS. 1, 5 and 10, side panels 24 and 26 are similar to one another in arcuate size and shape, while intermediate panel 22 is longer and generally flat relative thereto.

Side panel 24 includes a main flat arcuate body defining a first trapezoidal leg 40 and a second generally rectangular leg 42 integral to first leg 40 and angled relative to the latter. Preferably, legs 40 and 42 will be angled by about 90° relative to one another. First leg 40 includes a flat thin panel body 44 with a front edge 46 narrower than the rear edge 48 thereof, and a free lateral side edge lip portion 50 being partly offset from the plane of flat panel body 44. Lip portion 50 is sized complementarily to groove 36 for endwise engagement therein and for slidingly retained motion therealong. Transverse leg 42 preferably includes on its outer face an out-turned tab 52, which may be sine wave shaped, and outwardly projecting for example at mid-length of leg 42 integrally thereof as shown. Tab 52 forms a handle for facilitating manipulation of leg 42. Transverse leg 42 could also include connector means on a fraction or all of its inner face—for example a self-adhesive resilient strip 54—for fixedly securing—as suggested in FIG. 8—the side panel 24 to one lateral side of the console C (located between a car driver's seat D and a front passenger's seat S).

Similarly, side panel 26 includes a main flat arcuate body defining a first trapezoidal leg 56 and a second generally rectangular leg 58 integral to first leg 56 and angled relative to the latter. Preferably, legs 56 and 58 will be angled by about 90° relative to one another. First leg 56 includes a flat thin panel body 60 with a front edge 62 narrower than the rear edge 64 thereof, and a free lateral side edge lip portion 66 being partly offset from the plane of flat panel body 60. Lip portion 66 is sized complementarily to groove 38 for endwise engagement therein and for sliding retained motion therealong. Transverse leg 58 preferably includes on its outer face an out-turned tab 68, which may also be sine wave shaped, and outwardly projecting for example at mid-length of leg 58 integrally thereof as shown. Tab 68 forms a handle for facilitating manipulation of leg 58 Transverse leg 58 could also include connector means on a fraction or all of its inner face—for example a self-adhesive resilient strip 70—for fixedly securing the side panel 26 to the side of console C opposite the one to which is secured side panel 24.

As illustrated and for example, grooves 36 or 38 of the intermediate panel 22 could be hemispheric in cross-section; and side panel edge lips 50, 66, could also have a slight dovetail retention profile.

Figure 3:
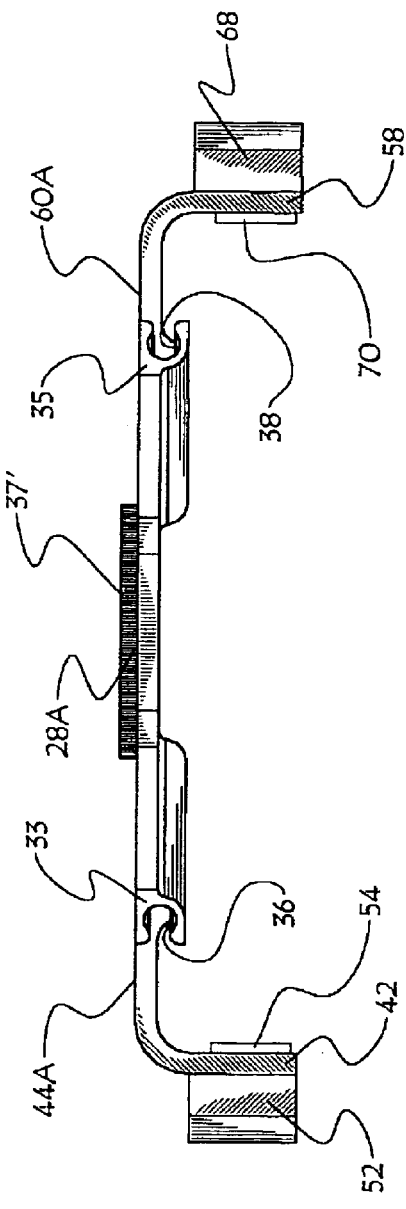
FIGS. 3 and 4 are front and rear end views respectively of this load securing assembly, at a smaller scale than for FIG. 2.
Figure 4:
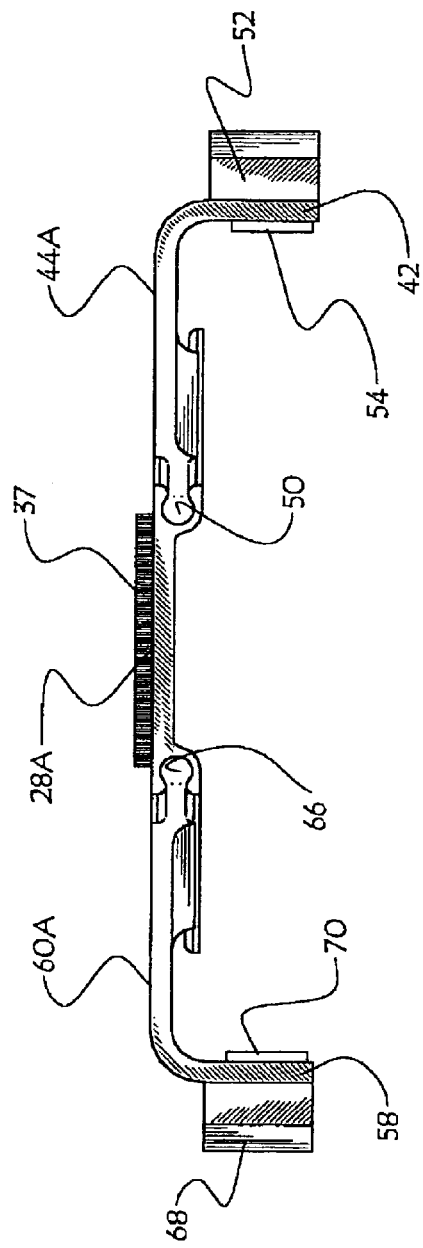
Figure 8:
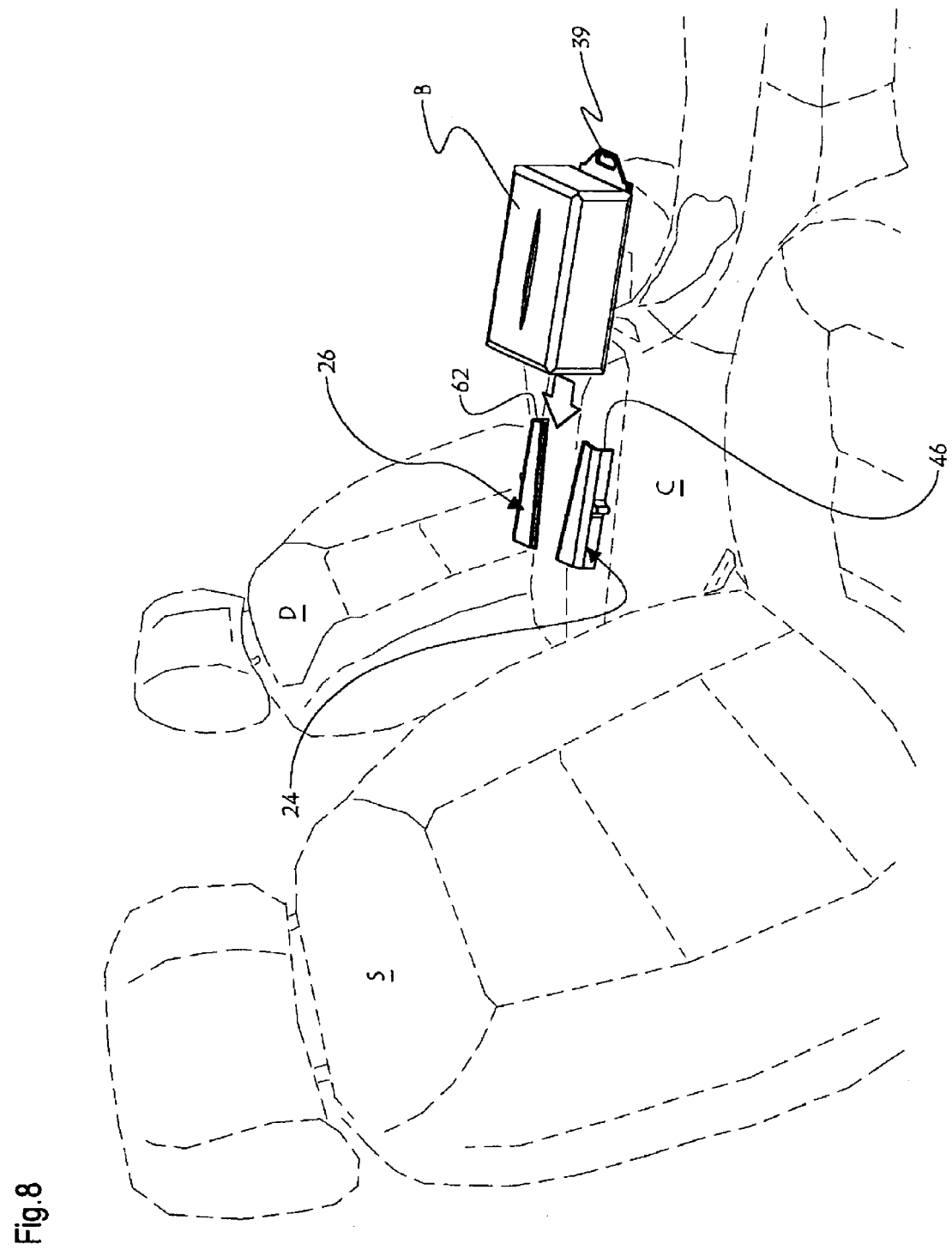
FIG. 8 is a perspective view of the front seats and console of the inside cockpit of a conventional automobile, shown in phantom lines, and further suggesting in full lines how said load securing means can enable attachment of the tissue box to the automobile central console.
Figure 9:
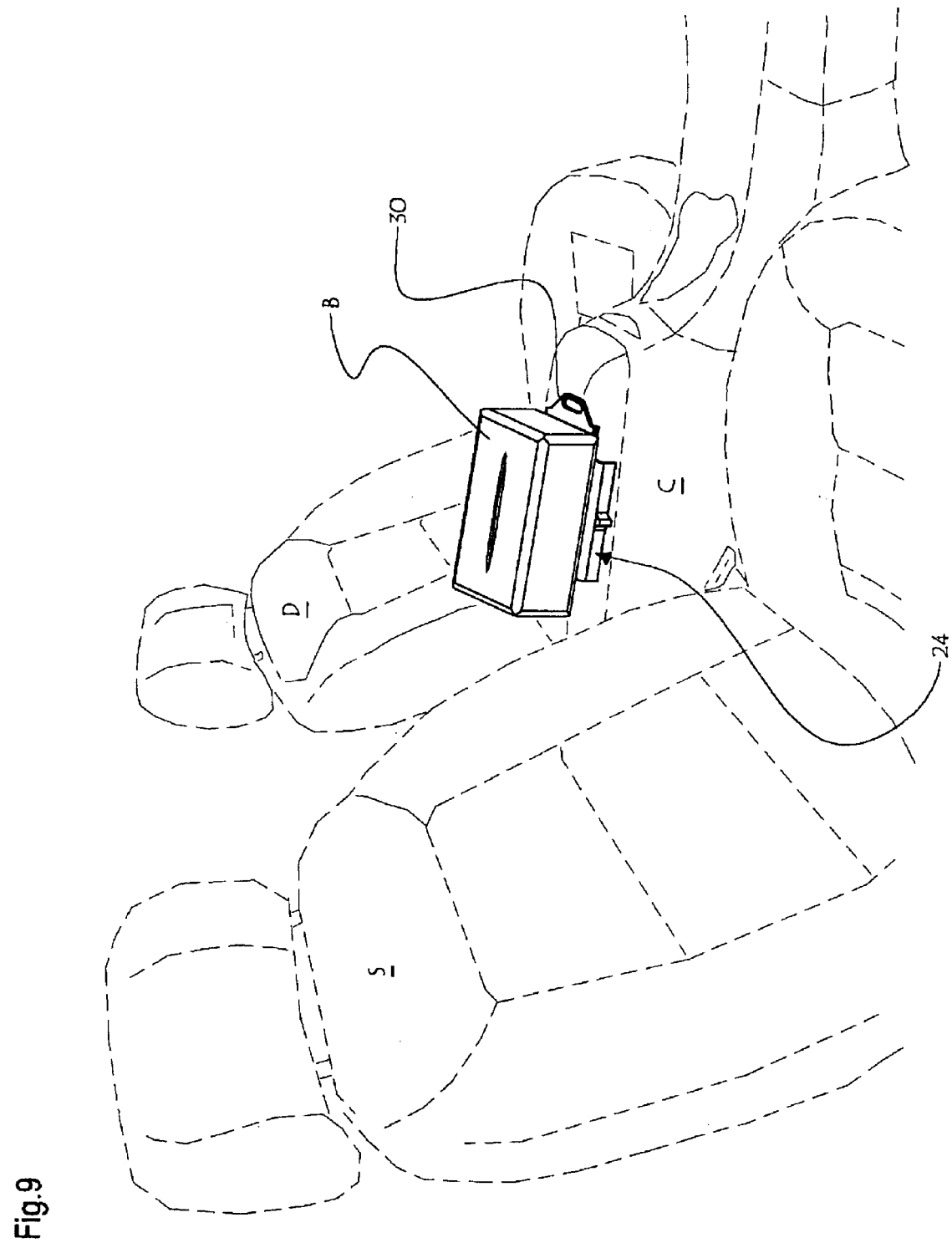
FIG. 9 is a view similar to FIG. 8, with the facial tissue box anchored to the console between the driver's seat and the front passenger's seat, by this load securing assembly.

As shown in FIGS. 3–4 and 10, the exterior faces 28A, 44A and 60A of panel portions 22, 24, 26, respectively, should form a flat generally continuous surface, to enable flat supporting engagement of load securing assembly 20 against a flat wall surface of a load article to be secured by the load securing assembly 20, for example the underface of a facial tissue box B (FIGS. 8–9).

In operation, and as sequentially suggested in FIGS. 8 and 9 of the drawings, the following steps are followed to releasably attach the facial tissue box B to the top cover surface of the console C:

a) The two arcuate side panels 24 and 26 are first mounted around opposite side corneredge portions on the top of the console C, with their narrow end edges 46, 62, facing forwardly toward the front windshield glass of the car;
b) The optional self-adhesive strips 54, 70, preferably anchor the side panels 24 and 26 to the console C, but strips 54 and 70 are not essential (without the strips 54, and 70, there is still frictional wedge interlock between the two side panels transverse legs 42, 58, and the side edge of the console C, due to the progressively tightening sliding wedge interlock of the side panel lips 50, 66 into side edge grooves 36, 38, of intermediate main panel 22);
c) The hook or loop strips 37 and 37' of the intermediate panel main body 28 are fixedly attached to the corresponding hook or loop strips of the underface of box B;
d) With the user holding the handle 39 at the enlarged front end 30 of intermediate panel 22, the narrow rear end 32 of intermediate panel 22 is manually engaged through the enlarged open front mouth defined between the front ends 46, 62 of side panels 24, 26;
e) The panel 22 and associated box B is then pushed rearwardly, so that lips 50, 66, engage and slide lengthwisely along grooves 36 and 38; and
f) The rearward slide motion of panel 22 is stopped once the narrow rear end 32 of intermediate panel 22 reaches a position extending slightly rearwardly beyond the enlarged ends 48, 64, of side panels 24, 26, as shown in FIG. 1, so that the front end portion 30 of intermediate panel 22 also maintain a position extending slightly forwardly beyond the narrow ends 46, 62, of side panels 24, 26.

With this attachment system 20, there is automatic self adjustment of the side panels 24, 26, to adapt to consoles from different car makes of variable widths. Assembly of the three main components 22, 24, 26, is done easily, quickly, and positive interlocking between these three components can be achieved with full manual rearward pushing force by the user.

To release the facial tissue box B from the top of the console C, the above steps (a) to (f) must then be taken backwards.

It is noted that the present load securing assembly 20 enables releasable attachment to the top upwardly opening hinged door of the console C, without hampering opening or closure thereof. Accordingly, the present load securing assembly 20 does not compromise in any way the pivotal motion of the hinged cover of console C, from its horizontal closed condition to its upright open condition.

The relative height of the side panels side walls 42, 58, should also be sufficient, particularly at their front ends 46, 62, to enable the user to clear the upright transmission gear shift (not illustrated) located ahead of console C, during installation (FIG. 8). In view thereof, side walls 42, 58 could preferably also be trapezoidal (not illustrated) so as to be of greater height at their narrow front ends 46, 62, relative to their larger rear ends 48, 64.

The preferred material for the three rigid panel components 22, 24, 26 of load securing assembly 20 is a plastic material, with the specific shape obtained by injection molding.

The optional self-adhesive strips 54, 70, preferably includes a partly compressible elastomeric material. Strips 54, 70 may be useful during strong driving, or when heavy engine vibrations can be expected as with high-output truck engines or sports car engines, to prevent accidental release from the console C, even when under wedge interlock.

The present load securing assembly 20 does not require any screws, bolts or nuts, and no tool is required for its installation. It is easily removable for transfer and installation from one vehicle to another vehicle. There is no maintenance required.

Although the present load securing assembly 20 has been described for use in securing a facial tissue box B over a car console C, other similar applications are considered within the scope of the invention. For example, the box B could be replaced by a coin holder, cellular phone holster, litter bag, CD cassette casing, sun glasses, business card support, pen/pencil holder, or the like; or a combination of two or more of these items could be concurrently supported by the load securing assembly 20. The car console C could also be replaced by other equivalent corner wall surfaces, in automobiles, water vessels, aircrafts, or other vehicles, or even in other areas—for example in buildings—, in particular where access is tight.

We claim:

1. A securing device for releasable attachment of a tissues box to a car console, the tissues box including an underface, the car console including a top wall with opposite first and second corner wall portions, said securing device comprising:

a) a trapezoidal template having a front edge, a rear edge opposite to and smaller than said front edge, and opposite first side edge portion and second side edge portion diverging in a rear fore direction, each of said first side edge portion and of said second side edge portion respectively forming a first female slider element and a second female slider element; said template further defining a top face, for registering with the tissues box underface, and a bottom face engagement with the car console top wall;

b) anchor means for releasable anchoring of said template top face to the tissue box underface;

c) an arcuate first wedge member having a front end, a rear end opposite to and larger than said front end, and opposite first free side edge portion and second side edge portion, said second side edge portion forming a male slider element complementary to said template first female slider element, said first free side edge portion for frictional engagement with the car console first corner wall portion;

d) an arcuate second wedge member having a front end, a rear end opposite to and larger than said front end, and opposite first free side edge portion and second side edge portion, the latter said second side edge portion forming a male slider element complementary to said template second female slider element, the latter first free side edge portion for frictional engagement with the car console second corner wall portion;

wherein upon fore to aft sliding motion of said template between said first wedge member and said second wedge member, said first wedge member and said second wedge member form wedge means for progressively tightening frictional interlock of said template with the console corner wall portions.

2. A securing device as in claim 1, wherein said anchor means consists of hook and loop fastener means.

3. A securing device as in claim 1, further including a self-adhesive resilient strip, mounted to at least a fraction of said first free side edge portion of at least one of said first wedge member and of said second wedge member, said resilient strip for mug engagement with a respective one of the car console corner wall portions.

4. A securing device as in claim 1, wherein at least one of said template, of said first free side edge portion of said first wedge member, and of said first free side edge portion of said second wedge member, includes a handle means for facilitating handling thereof.

* * * * *